United States Patent
Peacock et al.

(10) Patent No.: US 10,414,324 B2
(45) Date of Patent: Sep. 17, 2019

(54) CAMERA LIGHT

(71) Applicants: Stephen Thomas Peacock, Kentwood, MI (US); Elizabeth Jane Peacock, Kentwood, MI (US)

(72) Inventors: Stephen Thomas Peacock, Kentwood, MI (US); Elizabeth Jane Peacock, Kentwood, MI (US)

(73) Assignee: Pro-Vision, Inc., Byron Center, MI (US)

( * ) Notice: Subject to any disclaimer, the term of this patent is extended or adjusted under 35 U.S.C. 154(b) by 283 days.

(21) Appl. No.: 15/346,379

(22) Filed: Nov. 8, 2016

(65) Prior Publication Data

US 2017/0050553 A1 Feb. 23, 2017

Related U.S. Application Data

(63) Continuation of application No. 13/374,433, filed on Dec. 28, 2011, now Pat. No. 9,497,421, which is a continuation of application No. 12/181,058, filed on Jul. 28, 2008, now abandoned.

(60) Provisional application No. 60/952,106, filed on Jul. 26, 2007.

(51) Int. Cl.
| | |
|---|---|
| *G03B 17/00* | (2006.01) |
| *B60Q 1/00* | (2006.01) |
| *H04N 7/18* | (2006.01) |
| *B60R 11/04* | (2006.01) |
| *G03B 15/03* | (2006.01) |
| *G03B 17/56* | (2006.01) |
| *H04N 5/225* | (2006.01) |

(52) U.S. Cl.
CPC ............ *B60Q 1/0023* (2013.01); *B60R 11/04* (2013.01); *G03B 15/03* (2013.01); *G03B 17/561* (2013.01); *H04N 5/2252* (2013.01); *H04N 5/2254* (2013.01); *H04N 5/2256* (2013.01); *H04N 7/18* (2013.01); *B60R 2300/103* (2013.01)

(58) Field of Classification Search
USPC ....................................................... 396/427
See application file for complete search history.

(56) References Cited

U.S. PATENT DOCUMENTS

| | | |
|---|---|---|
| 3,885,091 A | 5/1975 | Fish et al. |
| 3,958,080 A | 5/1976 | Schadler |
| 5,089,895 A | 2/1992 | Fraker et al. |
| 5,642,238 A | 6/1997 | Sala |
| 6,100,921 A | 8/2000 | Rowley |

(Continued)

OTHER PUBLICATIONS

US 2,971,529 A, 02/1961, Hahnau et al. (withdrawn)
New Way Scranton Mfg. Co. Inc., "VIPER," Magazine, Dec. 2003, 1 page.

*Primary Examiner* — Rodney E Fuller
(74) *Attorney, Agent, or Firm* — Price Heneveld LLP (57) ABSTRACT

A camera light assembly (100) includes a camera assembly (102) and a marker light assembly (111). The camera assembly (102) includes a body (104) and a lens (108) positioned at a forward portion of the body (104). The marker light assembly (111) includes a light housing (112) having an aperture (118) extending therethrough. The body (104) of the camera assembly (102) is elongated and is received within the aperture (118) of the light housing (112) of the marker light assembly (111). Camera lock rings (126, 128) are utilized to releasably secure the camera assembly (102) to the marker light assembly (111).

16 Claims, 4 Drawing Sheets

(56) References Cited

U.S. PATENT DOCUMENTS

| | | |
|---|---|---|
| 6,115,060 A | 9/2000 | Rowley |
| 6,151,065 A | 11/2000 | Steed |
| 6,259,475 B1 | 7/2001 | Ramachandran et al. |
| 6,491,317 B1 | 12/2002 | Haen et al. |
| 6,491,417 B1 * | 12/2002 | Haen ................... B60Q 1/0023 250/330 |
| 6,509,832 B1 | 1/2003 | Bauer et al. |
| 6,550,949 B1 | 4/2003 | Bauer et al. |
| 6,663,260 B1 * | 12/2003 | Tieszen ............. G01N 21/8806 362/249.02 |
| 6,672,745 B1 | 1/2004 | Bauer et al. |
| 6,703,925 B2 | 3/2004 | Steffel |
| 6,741,286 B2 | 5/2004 | Meek et al. |
| 6,757,109 B2 | 6/2004 | Bos |
| 6,796,939 B1 * | 9/2004 | Hirata ................ A61B 1/00036 600/109 |
| 6,977,584 B2 | 12/2005 | Milliken |
| 7,111,968 B2 | 9/2006 | Bauer et al. |
| 7,292,281 B2 | 11/2007 | Cheng |
| 7,319,226 B2 | 1/2008 | Huang |
| 7,568,823 B2 | 8/2009 | Bauer et al. |
| 7,593,056 B2 | 9/2009 | Wubs |
| 8,308,637 B2 * | 11/2012 | Ishigami ............ A61B 1/00177 600/129 |
| 2002/0003571 A1 | 1/2002 | Schofield et al. |
| 2002/0044435 A1 * | 4/2002 | Pohlert ................... G03B 15/02 362/13 |
| 2003/0030180 A1 * | 2/2003 | Meek ................... H04N 5/2252 264/272.14 |
| 2003/0030745 A1 * | 2/2003 | Meek ................... H04N 5/2252 348/370 |
| 2003/0090569 A1 | 5/2003 | Poechmueller |
| 2003/0227546 A1 | 12/2003 | Hilborn et al. |
| 2004/0201463 A1 * | 10/2004 | Ko ........................... B60Q 1/30 340/435 |
| 2004/0233284 A1 | 11/2004 | Lesesky et al. |
| 2005/0046696 A1 | 3/2005 | Lang et al. |
| 2005/0093684 A1 | 5/2005 | Cunnien |
| 2005/0146641 A1 * | 7/2005 | Cheng .................. H04N 5/2256 348/373 |
| 2005/0206780 A1 * | 9/2005 | Iwasaki ..................... B60R 1/00 348/373 |
| 2005/0253923 A1 | 11/2005 | Komori et al. |
| 2006/0056077 A1 * | 3/2006 | Johnston ................ B60R 11/04 359/811 |
| 2006/0061655 A1 | 3/2006 | Wang |
| 2006/0087583 A1 * | 4/2006 | Wubs ................... H04N 5/2256 348/370 |
| 2006/0132600 A1 | 6/2006 | Chretien |
| 2006/0163481 A1 * | 7/2006 | Huang ............. G08B 13/19619 250/330 |
| 2006/0210256 A1 * | 9/2006 | Fukui ................. G06K 9/00255 396/67 |
| 2007/0216770 A1 | 9/2007 | Chang |
| 2007/0253211 A1 * | 11/2007 | Chang ...................... B60Q 1/56 362/494 |
| 2008/0099700 A1 * | 5/2008 | Frenzel ............ G08B 13/19619 250/553 |
| 2008/0266393 A1 | 10/2008 | Park |
| 2008/0266445 A1 | 10/2008 | Park |
| 2008/0278581 A1 * | 11/2008 | Inoue ........................ B60R 1/00 348/148 |
| 2009/0051515 A1 | 2/2009 | Fujinawa |
| 2009/0096869 A1 | 4/2009 | Huang |
| 2009/0310342 A1 | 12/2009 | Chang |
| 2010/0060733 A1 | 3/2010 | Lakshmanan |
| 2010/0238288 A1 * | 9/2010 | Klaerner ............. B60Q 1/0023 348/148 |

* cited by examiner

CAMERA LIGHT

CROSS REFERENCE TO RELATED APPLICATIONS

This application is a continuation of U.S. patent application Ser. No. 13/374,433, filed Dec. 28, 2011, and entitled "CAMERA LIGHT," now U.S. Pat. No. 9,497,421, issued on Nov. 15, 2016, which is a continuation of U.S. patent application Ser. No. 12/181,058, filed Jul. 28, 2008, and entitled "CAMERA LIGHT," now abandoned, which claims the benefit of U.S. Provisional Application No. 60/952,106, filed Jul. 26, 2007, entitled "CAMERA WITH MARKER LIGHT," the entire disclosures of each of which are incorporated herein by reference.

BACKGROUND OF THE INVENTION

The invention relates to camera systems which may be adapted for various uses and, more particularly, camera systems with means for providing illumination.

As vehicles have become relatively more sophisticated, substantial development work has occurred with respect to safety features for vehicles. For example, one problem which has existed for a substantial period of time relates to the capability of a driver to maneuver a vehicle relative to external obstacles. For this reason, side and rear view mirrors have been in use for a number of years. However, dependent upon the type, size and overall shape of a vehicle, mirrors having image surfaces visual to a driver often cannot "pick up" images of obstacles presenting safety concerns for the driver. That is, vehicular mirrors often must be positioned on vehicles in a manner so that proverbial "blind spots" still occur for the driver. For a number of various types of vehicles, such as semitrailer trucks, waste hauling trucks and the like, these blind spots can be relatively large.

It should also be noted that mirrors provide less than optimum vehicular security systems. For example, mirrors mounted on a truck do not provide the truck driver with an unobstructed view of the area immediately adjacent the rear door of the truck. The driver may then not be able to tell when unauthorized individuals are approaching the rear door so as to tamper with the truck or the like. Mirrors on recreational vehicles likewise are inadequate for occupants attempting to monitor suspicious activity outside the vehicles.

To alleviate these problems which cannot readily be solved by vehicle mirror design, it has become known to employ what could be characterized as "real time" cameras positioned at various locations on a vehicle. Such cameras, for example, may be directed to a lower rear area behind a vehicle which often represents a blind spot with respect to side and rear view mirrors. These video cameras are often directly connected to video monitors within the cab or cockpit of the vehicle, in a manner such that the monitors are readily visible to the driver. During a backup or similar procedures, these cameras can facilitate maneuvering of the vehicle by the driver so as to avoid external obstacles.

An example of one type of vehicle-mounted camera system is disclosed in Steed, et al., U.S. Pat. No. 6,151,065 issued Nov. 21, 2000. The Steed, et al. patent is directed to a concealed vehicular system for a motor vehicle which permits the operator to view or record events occurring inside or outside the vehicle. A miniature camera is concealed within a functional component of the vehicle, such as within a rear view mirror or a lighting device of the vehicle. Steed, et al. include the capability of having images from the vehicle cameras stored in a recording device, such as a video camera recorder. As an alternative, the images can be transmitted to a viewing screen, such as a cathode ray tube monitor or liquid crystal diode, within the view of the driver.

Using numerical references within the Steed, et al. patent for purposes of description, Steed, et al. disclose a camera assembly as having a miniature camera 2 which may be a commercially available CCD camera mounted inside a vehicle running light housing. The lens of the camera is positioned at a 90° angle and the camera is illuminated and runs on a DC vehicle battery. The camera is positioned within a cavity 6 formed within the base 8 of a housing 4. Light bulbs 10, 12 are mounted on both sides of the camera 2. A lens cover 14 is secured over the top of the base 8, providing protection for both the camera and the light bulbs, and concealment for the camera. The lens cover 14 is identified as typically being fabricated from plastic.

A rotatable bracket 16 is used to secure the base 8 of the housing 4 to the side of a vehicle. The bracket 16 has extensions 18, 20 attached by means of pins 22, 24 to both sides of the base. As primarily shown in FIG. 4, the housing 4 can be rotated relative to the vehicle surface upon which the base 8 is secured, so as to provide for different viewing angles for the camera 2.

A video cable 26 is utilized to connect the camera 2 to a video monitor inside the vehicle. The cable 26 can be a conventional video component containing power, ground and video lines 28 capable of supplying power to the camera and carrying video signals to the monitor. Steed, et al. explain that details associated with the connections between the camera 2 and the video monitor are well understood by those of ordinary skill in the art.

The cable 26 passes through an opening 30 in the back of the base 8, and a similar opening 32 in the bracket 16 to the interior of the vehicle. As an option, electrical conductors 34, 36 can carry electrical current from the vehicle power supplies so as to operate the light bulbs 10, 12. These conductors 34, 36 can also be placed inside the cable 26. In addition, a small cut-out portion 38 can be formed in the side of cavity 6 of the base 8, so as to provide room for the cable 24 when the camera 2 is mounted inside the cavity. For purposes of preventing light emitted by 5 the light bulbs 10, 12 from interfering with operation of the camera 2, partitions 40, 42 are placed on both sides of the camera inside the lens cover 14. The partitions 40, 42 are fabricated from a heat resistant material, such as aluminum or non-heat deformable plastic. The partitions 40, 42 fit in slots 44, 46 formed in the base 8 of the housing 12. When the light bulbs 10, 12 are operational, the partitions 40, 42 screen light from the lens of the camera 2. A third partition 48 (shown in phantom line format in FIG. 5) can optionally be placed in a slot 50 above the camera 2 for purposes of serving as a heat shield. A similar partition (not shown in the Steed, et al. drawings) can optionally be placed below the camera 2 inside the lens cover 14 for the same purpose.

FIG. 6 of the Steed, et al. patent illustrates a pair of running lights 52, 54 containing camera assemblies constructed in accordance with the Steed, et al. disclosure. These running lights 52, 54 are mounted along the top rear surface of a vehicle 56, which may be a recreational vehicle or the like. A pair of cables 58, 60 from the cameras in the running lights 52, 54 are connected in conventional fashion to a pair of video monitors 62, 64 inside the vehicle. As an alternative, the cameras in the running lights 52, 54 could be connected to a single video monitor through a switching circuit which selects, for display, the video images from either the camera in the right running light 52 or the left hand running light 54.

Steed, et al. also describe the concept that the concealed camera system is not restricted to running lights and may, as an example, be placed within vehicle brake lights 66, 68 and connected through cables 70, 72 to monitors 62, 64. Steed, et al. further explain that their camera system can be applied to substantially any vehicle lighting component, so long as provisions are made to conceal the camera behind the light lens and screen the camera lens from the light bulbs in the lighting component.

With reference to FIG. 6 of the Steed, et al. patent, images produced by the video camera arrangement can be transmitted to a video monitor within the view of the vehicle driver. This allows the driver to see in "real time" events occurring to the rear of the vehicle without suffering difficulties inherent in using rear view and side view mirrors, which often produce blind spots and reflect blinding light from other vehicles into the driver's eyes.

Steed, et al. also disclose a circuit (in FIG. 7) for switching video images from a right hand concealed camera to a left hand concealed camera as a function of the position of the vehicle turn indicator. A video monitor is positioned inside a vehicle at position 74. Circuits 76, 78 respectfully control transmission of video images from right hand and left hand concealed cameras. The circuits 76, 78 can be switches through which video images are transmitted to the 15 video monitor 74 when the circuits 76, 78 are energized. Switches 80, 82 can be operated by relays 84, 86 positioned within the circuits 76, 78 so that closure of the switch 80 provides the video monitor 74 with video images from the right hand concealed camera. Correspondingly, closure of the switch 82 provides the video monitor with images from the left hand concealed camera. In this particular embodiment, relays 84, 86 are, in turn, connected to the vehicle turn indicator 88 through a relatively simple electro-mechanical arrangement constructed in accordance with technology known to those of ordinary skill in the art.

Several problems exist with respect to known types of video cameras which operate in real time. For example, one difficulty relates to illumination. That is, the area behind a vehicle or the like may not have sufficient illumination so as to provide an image to the driver or other user. With the lack of sufficient illumination, images may not be sufficiently visible so as to be recognizable with respect to both brightness and resolution. For this reason, it is advantageous to provide some type of illumination which may be associated with the camera. However, even with this advantageous concept, difficulty can exist with respect to actual and physically realizable apparatus having cameras and illumination means associated therewith.

For example, incorporating illumination apparatus and electronics with a camera can result in a relatively complex structure. Such a structure may be difficult and relatively expensive to manufacture. Still further, if a camera is essentially manufactured in a manner so that it is mechanically and electrically "integral" with the illumination means, additional problems can exist. As an example, if electrical components associated with the illumination means fail, and the camera has been constructed as an integral part of the illumination means, then the resulting apparatus is likely expensive, both with respect to initial costs and with respect to replacement. That is, an electrical defect associated with the illumination means would require replacement of both the illumination means and the camera. This may also be true in the reverse. That is, with an integral electronic structure, defects or failures associated with the camera may correspondingly require replacement of an entire unit consisting of both the camera and the illumination means. In addition, not only electrical defects or failures may occur, but mechanical defects or mechanical damage may also occur. If the camera is essentially mechanically integral with the mechanical structure of the illumination means, mechanical damage or defects to either the camera or the illumination means may require replacement of an entire unit consisting of the combination of the camera and illumination means.

Also, it should be noted that vehicles typically require tail or other types of lights in the rear portions of the vehicles. In addition, relatively large vehicles, such as trucks and the like, will also often require various types of lights on the sides or other portions of the truck vehicles. For purposes of providing for sufficient illumination for use of video cameras and the like, it would be advantageous if the conventionally required lights on the vehicles could be utilized. Accordingly, it would be advantageous if the camera apparatus could somehow be incorporated in some way with the light structures, while still maintaining an electrical and/or mechanical independence.

SUMMARY OF THE INVENTION

In accordance with the invention, a camera light assembly is provided which is adapted to provide visual images to a user remote from an area of visual range of the camera light assembly. The assembly includes a camera assembly having a body and a lens positioned at a forward portion of the body. A marker light assembly provides illumination for the visual range of the camera light assembly, and the camera assembly is releasably secured to the marker light assembly. The marker light assembly includes light means for providing the illumination, and light electrical circuit means for powering the light means. Camera electrical means provide a transmission path from the camera assembly so as to transmit video images generated by the camera assembly. The camera electrical means also operates so as to power the camera assembly. The light electrical circuit means and the camera electrical means function separate and independently from one another.

In accordance with other aspects of the invention, the marker light assembly includes aperture means for receiving the body of the camera assembly within the marker light assembly. Means are also provided for releasably securing the camera assembly to the marker light assembly.

These and other features, advantages, and objects of the present invention will be further understood and appreciated by those skilled in the art by reference to the following specification, claims, and appended drawings.

DETAILED DESCRIPTION

The principles of the invention are disclosed, by way of example, in a camera light assembly 100 as described in subsequent paragraphs herein and illustrated in FIGS. 1-4. Although the general concepts of camera systems is well known for use with various types of vehicles, camera light assemblies in accordance with the invention provide substantial advantages over the known prior art. One concept of the camera light assemblies in accordance with the invention relates to the use of illumination used with the camera. More specifically, the camera portion of the camera light assembly is effectively associated with the structure comprising means for generating illumination. In accordance with certain aspects of the invention, the camera portion of the assembly may be received within the body of the light or other means for illumination. Still further, in accordance with other concepts of the invention, the electrical circuitry of the camera portion of the assembly is separate and independent from the electrical circuitry associated with the light portion of the assembly. In addition, in accordance with further concepts which may be associated with the invention, the mechanical structures of the camera portion of the assembly and the light portion of the assembly may be coupled or otherwise releasably secured together. However, at the same time, they can be separately disassembled, so that if a camera portion becomes defective or otherwise fails, it can be replaced without the necessity of replacing the entirety of the camera light assembly. Correspondingly, the light portion of the assembly can also be replaced in the event of defaults or failures, without requiring replacement of the camera portion of the assembly. This advantage is provided through both the electrical and the mechanical "independence" of the separate portions of the assembly.

In accordance with another concept associated with the invention, the illumination may be provided by a series of LED lights. Still further, an additional concept in accordance with certain aspects of the invention relates to requirements for lenses. More specifically, with the structures associated with camera light assemblies in accordance with the invention, there is no requirement (and thus no disadvantages) of having the lens which covers the illumination also covering the camera. This absence of requiring lens coverage over the camera may reduce the quantity of illumination required for use of the camera, and substantially enhance the images produced by the camera. Also, it permits the camera to be positioned so as to facilitate increasing the viewing angle and scope of the image.

Still further, other concepts associated with camera light assemblies in accordance with the invention should be noted. Specifically, it is possible to provide for remote cameras which have their own illumination or are otherwise sufficiently powerful so as to require very little illumination. As an example, an infra-red camera could be utilized. However, as is well known, vehicles of various types require tail or other types of lights in the rear portions of the vehicles. Also, relatively large vehicles, such as trucks and the like, often require lighting structures on the sides and other areas of the vehicle. In the following paragraphs, references are made to a marker light assembly 111 having a light housing 112 and light circuitry 120. One concept which can be an advantage in accordance with certain aspects of the invention relates to the fact that the light components which are associated with the camera light assemblies in accordance with the invention may be the lights which would be required for use with the vehicles, independent of use of any remote cameras. Accordingly, one aspect of the invention is that the requirement for having certain lighting components positioned at certain locations on the vehicles is taken advantage of with respect to using these same lighting components to provide illumination for the remote cameras. This reduces the need for providing cameras which can achieve a sufficient amount of brightness and resolution without any separate means for illumination. That is, the conventional requirement and positioning of light components can be taken advantage of for a "secondary purpose" of providing illumination for the camera structures in accordance with the invention.

Figure 1:
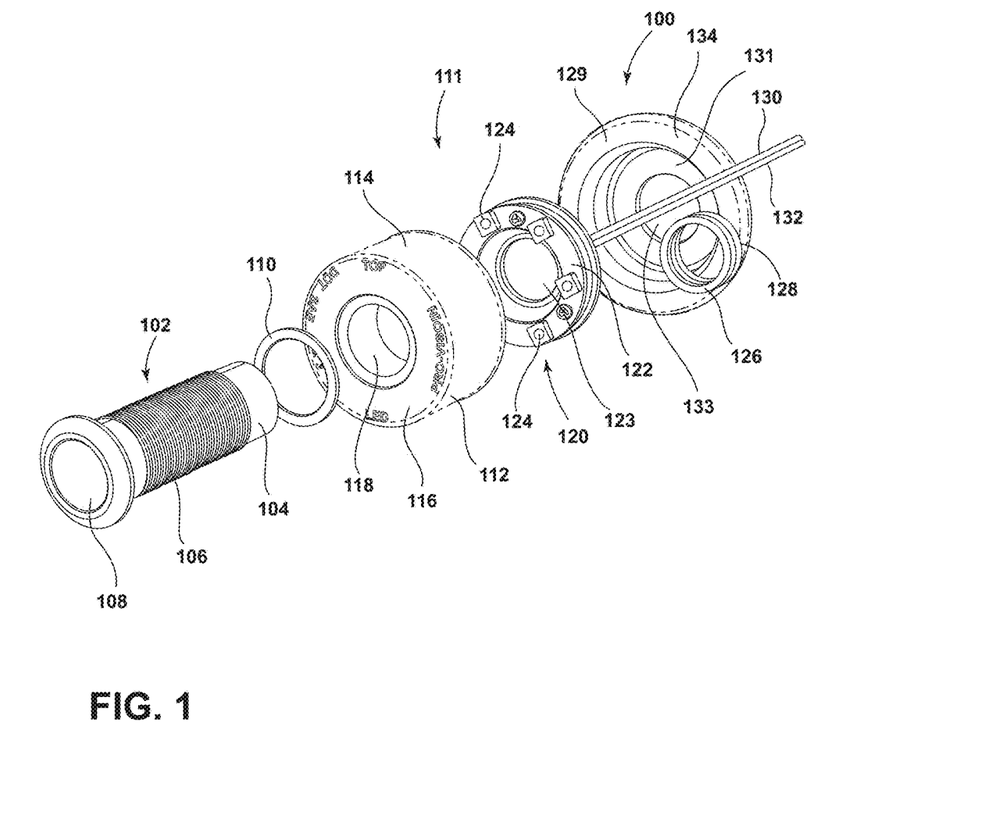
FIG. 1 is a perspective and exploded view showing the various components of a camera light assembly in accordance with the invention.
Figure 2:
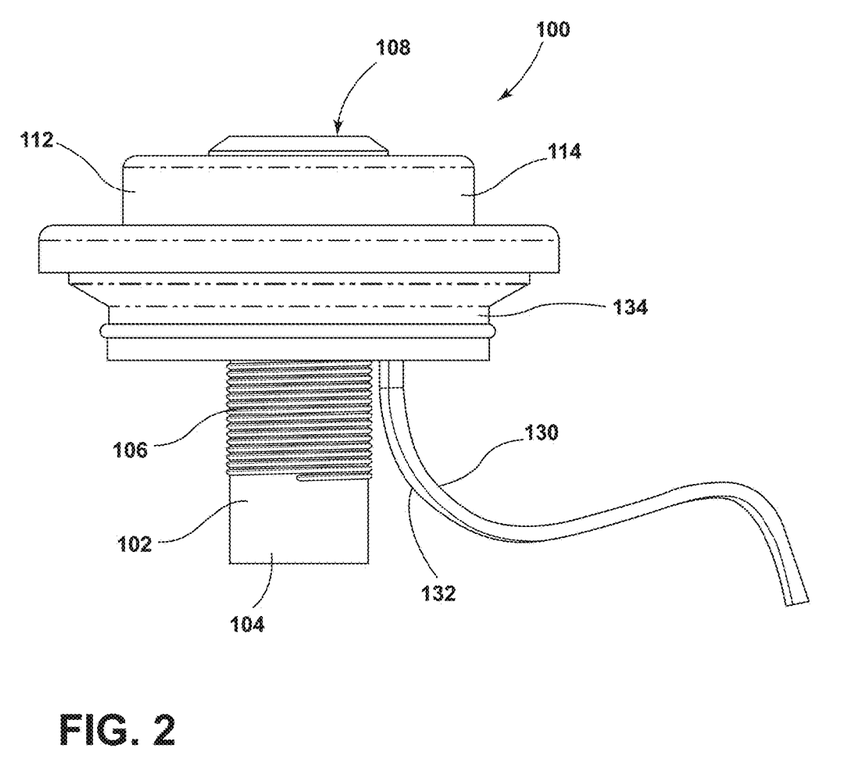
FIG. 2 is a side, elevation view of the fully assembled camera light assembly illustrated in FIG. 1.
Figure 3:
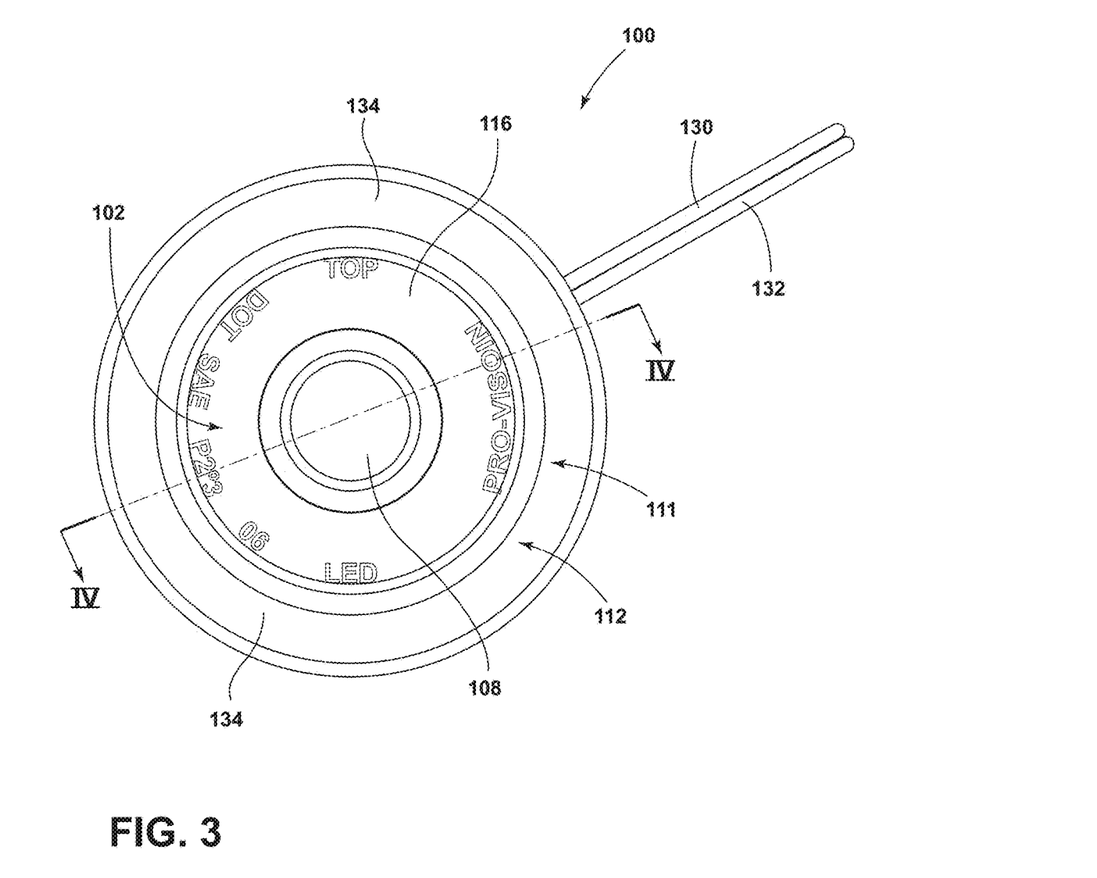
FIG. 3 is a plan view of the camera light assembly illustrated in FIG. 1, and in a fully assembled state.
Figure 4:
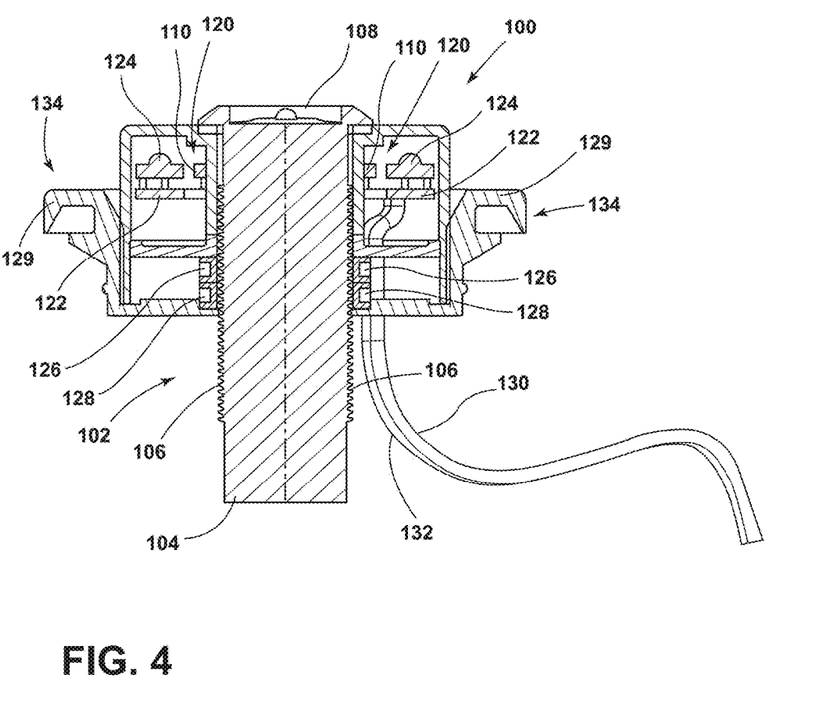
FIG. 4 is a side, sectional view of the camera light assembly illustrated in FIG. 1, and taken along section lines 4-4 of FIG. 3.

Turning to the drawings, FIGS. 1-4 illustrate an example embodiment of a camera light assembly 100 in accordance with the invention. Specifically, FIG. 1 is an exploded view of the camera light assembly 100. FIG. 2 is a side, elevation view of the camera light assembly 100 in a fully assembled state. FIG. 3 is a plan view of the camera light assembly 100, while FIG. 4 is a side, sectional view of the camera light assembly 100, taken along section liens 4-4 of FIG. 3. With reference to the drawings, the camera light assembly 100 includes a camera 102 which may be in the form of a relatively small video camera or the like. The camera 102 can be electrically connected to a camera cable 130. The camera cable 130, in turn, can be connected to video projection means (not shown) or the like, so as to provide a visual image to, for example, a driver in a vehicle. The camera or camera assembly 102 includes, in this particular embodiment, a cylindrical body 104 having a knurled or threaded portion 106. The internal circuitry of the camera assembly 102 includes a camera which obtains images through a forward lens 108. As apparent from the drawings, the camera assembly 102 will receive power through the camera cable 130, which is substantially "independent" of components associated with electrical circuitry of the light portion of the camera light assembly 100. With reference particularly to FIGS. 1 and 4, the camera assembly 102 also includes a camera gasket 110. When assembled, the body 104 of the camera assembly 102 is received within the camera gasket 110.

In addition to the camera assembly 102, the camera light assembly 100 also includes a marker light assembly 111. Again, with reference primarily to FIGS. 1 and 4, the marker light assembly 111 provides a means for generating illumination within the spatial area 15 for which video images are being received through the camera assembly 102. In the particular embodiment shown in the drawings, the marker light assembly 111 includes a light housing 112. The light housing 112 includes a cylindrical or annular portion 114. A front surface 116 is coupled to or integral with the cylindrical portion 114. As with conventional light housings, the light housing 112 can have a relative transparency and color hue appropriate for providing an optimum level of illumination and resolution for the images received through the camera assembly 102. The light housing 112 also includes a cylindrical aperture 118. As shown in particular in FIGS. 2, 3 and 4, the body 104 of the camera assembly 102 is received within the aperture 118 of the light housing 112.

With reference again to FIGS. 1 and 4, the marker light assembly 111 includes light circuitry 120 adapted to be received within the light housing 112. The light circuitry 120 includes a conventional base 122. A series of lights 124 may be spaced apart on a forward surface of the base 122. The lights 124 may be in the form of LED's or similar means for illumination.

When assembled, the light circuitry 120 is received within the light housing 112 of the marker light assembly 111. The camera gasket 110 is received on the body 104 of the camera assembly 102, and the camera assembly 102 is then received within the aperture 118 of the light housing 112. For purposes of further receiving the body 104 of the camera assembly 102, the base 122 of the light circuitry 120 may also include an aperture 123. With the camera assembly 102 extended through the apertures 118 and 123 of the light housing 112 and light circuitry 120, respectively, camera lock rings 126 and 128 can be threadably received on the knurled or threaded portion 106 of the body 104 of the camera assembly 102. The camera lock rings 126, 128 are utilized to releasably secure the camera assembly 102 to the marker light assembly 111.

If desired, for purposes of assembly and attachment to a vehicle or the like, the camera light assembly 100 can also include a grommet 134 having a structure and configuration primarily shown in FIGS. 1 and 4. The grommet 134 can include a rim 129, inner recess 131 within the rim 129, and an aperture 133 extending through the inner recess 131. The aperture 133 can be utilized to receive the lower portion of the body 104 of the camera assembly 102.

In accordance with all of the foregoing, an assembly 100 has been described and illustrated in accordance with the invention which provides a number of advantages over the prior art. The assembly 100 is a camera and light combination configuration. Advantageously, a cover or housing is provided which shields the light source. However, the lens or lens cover does not extend in a manner which covers or otherwise encloses the camera. In part, this is advantageous in that relatively better resolution of images produced by the camera 102 can be achieved. Also, illumination intensity can be relatively smaller. Further, the front of the camera is substantially flush with the light source surrounding the camera and other structural components of the assembly 100. This flush configuration is in contrast to a number of known systems where the camera may be recessed relative to other structure. If the camera or image sensor is recessed, the scope of the viewing angle is reduced. However, with this concept of the assembly 100 being provided in accordance with the invention, the flush design for the camera or image sensor allows for a relatively wider angle of image sensing.

In addition to the foregoing, this configuration of a combination of a video camera and a light source represents a structure where the camera or image sensor is actually "built into" the structure for the light source. That is, the light source can provide for various types of functions, independent of image sensing. For example, the light source may represent the capability of various types of vehicle signaling functions.

In addition to the foregoing, it is noted that the camera assembly 102 and the marker light assembly 111 are essentially electrically and mechanically "independent" although the camera assembly 102 is releasably coupled to the marker light assembly 111 when assembled. This independence provides for facilitating manufacture. In addition, and as earlier stated, replacement is relatively easy and relatively less expensive, since defects or failures associated with the camera assembly 102 would not require replacement of the entirety of the camera light assembly 100. Correspondingly, defects or failures associated with the electrical or mechanical components of the marker light assembly 111 would not require replacement of the camera assembly 102.

In accordance with certain aspects of the forgoing, the camera light assembly can be characterized as being adapted to provide visual images to a user where the user is remote from the camera light assembly. The user is also remote from an area of what can be characterized as a "visual range" of the camera light assembly. The marker light assembly (111) can be characterized as having "light means" in the form of the LED lights 124 for providing illumination for the visual range of the camera light assembly 100. In addition, the light cable 132 can be characterized as providing a means for powering the lights 124. Of course, it should be apparent that the light cable 132 can be utilized for switching functions or the like, and that the lights 124 comprising the lighting means could be powered by means such as low voltage battery power or the like.

The camera assembly 102, with the camera cable 130, can be characterized as having a cable 130 which provides for a camera "electrical means" so as to provide a transmission path from the camera assembly 102 for purposes of transmitting visual images generated by the camera assembly to a remote user and remote equipment (not shown). The camera cable 130 can also be utilized to provide power to the camera assembly 102, and can be characterized as essentially comprising "camera electrical means." Also, power for the camera assembly 102 may be provided by means of batteries or the like located within the camera assembly 102 itself. Such batteries (not shown) can also be characterized as part of the camera electrical means. Still further, the camera lock rings 126, 128 can be characterized as providing a means for releasably securing the camera assembly 102 to the marker light assembly 111. It should also be noted that with respect to the features of the invention which consist of the electrical and mechanical independence, it may be possible to actually couple or otherwise releasably secure the camera assembly 102 to the marker light assembly 111 at other positions other than through the aperture 118. Further, however, the capability of receiving the camera assembly 102 within the marker light assembly 111 is an advantageous feature in accordance with certain concepts of the invention.

It will be apparent to those skilled in the pertinent arts that other embodiments of camera light assemblies in accordance with the invention may be designed. That is, the principles of these assemblies are not limited to the specific embodiment described herein. Accordingly, it will be apparent to those skilled in the art that modifications and other variations of the above-described illustrative embodiment of the invention may be effected without departing from the spirit and scope of the novel concepts of the invention.

The invention claimed is:

1. A method of installing a camera light assembly to a vehicle, the method comprising:
    providing a camera light assembly having a housing and a camera secured to the housing, the housing including an outer side having an opening therethrough, an inner side, and a mounting structure configured to connect the housing to an existing vehicle light mount, wherein the camera includes an outer end having a lens and an inner end opposite the outer end;
    positioning the camera at least partially in the opening in the outer side of the housing;
    securing the camera to the housing such that the inner end protrudes inwardly and the lens is in an exposed configuration in which the lens is not covered;
    providing a light assembly including at least one light source inside the housing whereby the at least one light source illuminates at least a portion of the outer side of the housing;
    operably connecting an electrical power line to the at least one light source; and
    mounting the camera light assembly to a vehicle by connecting the mounting structure of the housing to an existing vehicle light mount for a required vehicle light.

2. The method of claim 1, wherein:
    the mounting structure of the light assembly comprises an outwardly-extending lip and including:

positioning the lip adjacent an outer surface of the vehicle adjacent the existing vehicle light mount.

3. The method of claim 1, including:
operably connecting a power and video camera cable to the camera to transmit power and images.

4. The method of claim 3, wherein:
the power and video camera cable is not connected to the light assembly, and the electrical power line is not connected to the camera assembly; and including:
disassembling of the camera from the light assembly without disconnecting the camera cable from the electrical power line.

5. A camera light assembly for vehicles, comprising:
a light assembly having a housing the housing including an outer side, an inner side, and a mounting structure configured to connect the housing to an existing vehicle light mount, wherein the housing includes a camera support structure comprising an opening in the outer side and an outwardly-facing surface on the outer side around the opening, the housing configured to receive at least one light source inside the housing and wherein at least a portion of the housing comprises a light-transmitting material whereby the at least one light source illuminates at least a portion of the outer side of the housing, wherein
a camera assembly removably secured to the housing and engaging the camera support structure of the housing, wherein the camera assembly includes a camera having an outer end having a lens facing in an outward direction and an inner end opposite the outer end, and an axis extending through the inner and outer ends and a flange at the outer end extending transversely outward away from the axis, the flange including a support surface facing in an inward direction opposite the outward direction and operably engaging the outwardly-facing surface around the opening;
a power and video camera cable connected to the camera to transmit power and images;
and wherein the power and video camera cable is not connected to an electrical power line of a light source such that the camera assembly can be disassembled from the housing without disconnecting the camera cable from an electrical power line of a light source.

6. The camera light assembly for vehicles of claim 5, including:
a gasket disposed between the outwardly-facing surface of the housing and the support surface of the flange.

7. The camera light assembly for vehicles of claim 5, wherein:
the mounting structure of the light assembly comprises an outwardly-extending lip.

8. The camera light assembly for vehicles of claim 5, wherein:
the outer side of the housing comprises an opening; and
the camera includes a lens aligned with the opening such that the lens is not disposed inside the housing.

9. The camera light assembly for vehicles of claim 8, wherein:
the housing defines a front side wall; and
the camera support structure comprises a cylindrical inner surface extending inwardly from the front side wall to define a passageway connected to the opening in the outer side of the housing.

10. The camera light assembly for vehicles of claim 9, wherein:
at least a portion of the camera is disposed in the passageway.

11. The camera light assembly of claim 10, wherein:
the camera includes a retaining lip that engages the outer side of the housing and limits inward movement of the camera in the passageway.

12. The camera light assembly of claim 11, wherein:
the camera includes a body having threads; and including:
at least one threaded lock member configured to engage the threads of the camera body to limit movement of the camera in the passageway.

13. The camera light assembly of claim 12, wherein:
the camera includes a cylindrical outer surface that slidably engages the cylindrical inner surface of the housing whereby the camera can be disassembled from the housing upon removal of the at least one threaded lock member.

14. The camera light assembly of claim 5, wherein:
the inner end of the camera protrudes from the inner side of the housing.

15. A method of installing a camera light assembly to a vehicle, the method comprising:
providing a camera light assembly having a housing and a camera secured to the housing, the housing including an outer side, an inner side, and a mounting structure configured to connect the housing to an existing vehicle light mount, wherein the housing includes a wall extending inwardly from the outer side to define a passageway connected to the opening in the outer side of the housing, and wherein the camera includes a retaining lip;
providing a light assembly including at least one light source inside the housing whereby the at least one light source illuminates at least a portion of the outer side of the housing;
operably connecting an electrical power line to the at least one light source; and
mounting the camera light assembly to a vehicle by inserting the camera into the passageway through the opening in the outer side of the housing and causing the retaining lip to engage the outer side of the housing to limit inward movement of the camera in the passageway connecting the mounting structure of the housing to an existing vehicle light mount.

16. The method of claim 15, wherein:
the camera includes a body having threads; and including:
threadably engaging lock members with the threads of the camera body to retain the camera in the passageway.

* * * * *